United States Patent [19]

Eggleton et al.

[11] Patent Number: 4,466,598
[45] Date of Patent: Aug. 21, 1984

[54] LOAD LIMITING APPARATUS FOR HOISTS

[75] Inventors: Cecil H. Eggleton, Fruitport; William F. Henry, Muskegon, both of Mich.

[73] Assignee: Dresser Industries, Inc., Dallas, Tex.

[21] Appl. No.: 384,807

[22] Filed: Jun. 3, 1982

[51] Int. Cl.³ .......................... B66D 3/16; F16D 7/02
[52] U.S. Cl. ................................... 254/358; 254/372; 464/46; 192/56 R
[58] Field of Search ............... 254/352, 358, 372, 375, 254/391, 353, 354, 365, 366, 376, 903; 192/12 B, 55, 56 R; 464/37, 45, 46, 49; 226/188, 190, 194

[56] References Cited

U.S. PATENT DOCUMENTS

| | | | |
|---|---|---|---|
| 1,190,482 | 7/1916 | Tibbals | 254/391 X |
| 2,753,703 | 7/1956 | McIntyre | 464/64 X |
| 3,090,601 | 5/1963 | Robins | 254/375 X |
| 3,220,702 | 11/1965 | Caldwell | 254/365 |
| 3,724,815 | 4/1973 | Hawkins et al. | 254/358 X |
| 3,797,621 | 3/1974 | James | 192/56 R |
| 3,953,000 | 4/1976 | Zorbaugh | 254/372 |

Primary Examiner—Stuart S. Levy
Assistant Examiner—Katherine Jaekel
Attorney, Agent, or Firm—Roy L. Van Winkle

[57] ABSTRACT

The improved load limiting apparatus includes a chainwheel that is mounted on the hoist drive shaft and adapted to receive the drive chain. The chainwheel includes a hub connected to the drive shaft, an annular clamping member located in juxtaposition to the hub and adjustably attached thereto, and an annular chainwheel rim located in encircling relationship to the hub and clamping member and having a bifurcated flange in frictional engagement with the hub and clamping member, whereby the rim can move relative to the hub and clamping member after a pre-determined torque load is imposed on the rim by the drive chain.

7 Claims, 2 Drawing Figures

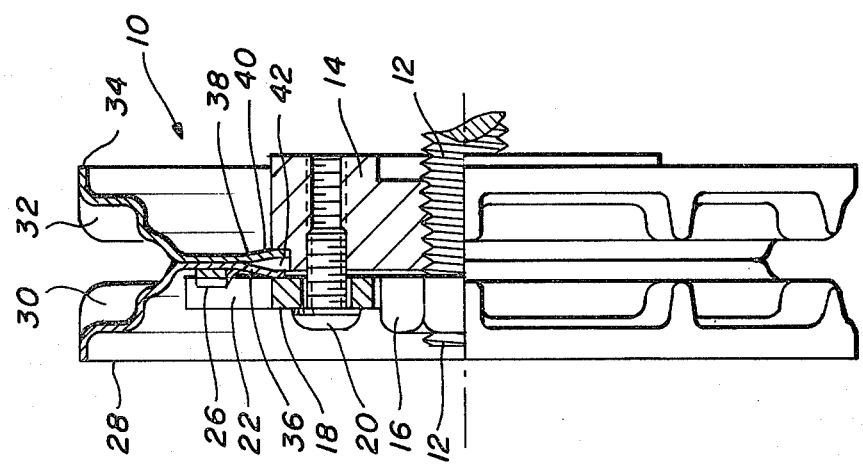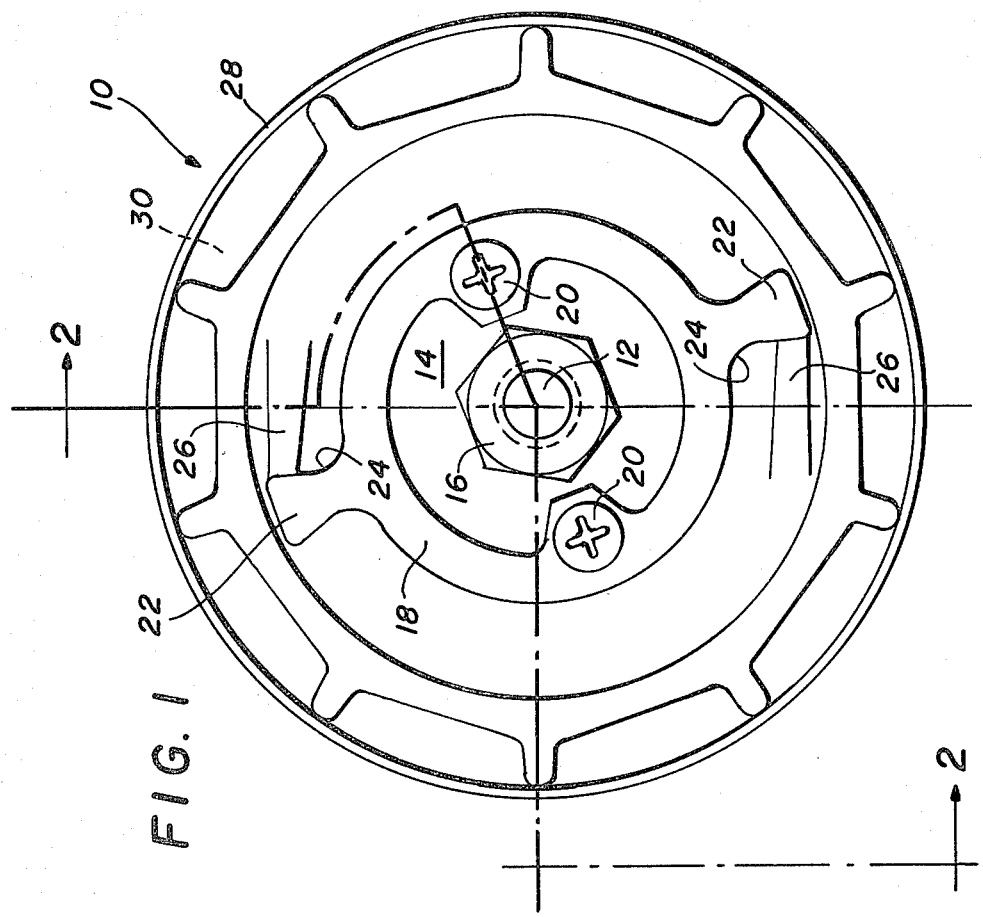

LOAD LIMITING APPARATUS FOR HOISTS

BACKGROUND OF THE INVENTION

This invention relates generally to a chain hoist. More particularly, but not by way of limitation, this invention relates to an improved load limiting apparatus for a chain hoist.

It is highly desirable to be able to prevent an overload being imposed on a chain hoist. It is desirable, not only because of possible damage to the hoist, but also because of possible injury to the person using the hoist. Accordingly, it has been found convenient to provide a chainwheel or drivewheel in the hoist that includes some means for permitting rotational or relative rotational movement between the portion of the chainwheel being driven by the chain, and the hub portion that is connected to the drive shaft of the hoist. Such relative rotation occurs when an over load exists and prevents the hoist from lifting the load.

The foregoing is illustrated in the following U.S. Pat. Nos.: 3,724,815 issued Apr. 3, 1973 to Harold W. Hawkins, et al; 3,770,086 issued Nov. 6, 1973 to Harry Y. Jackson et al; and 3,953,000 issued Apr. 27, 1976 to William R. Zorbaugh. In the '086 patent, relative motion is permitted when a particular torque load is imposed due to a plurality of spring loaded balls that are carried by the hub and ride in recesses provided in the outer chain driven rim of the hoist. The balls are spring-loaded in slots and are urged against the rim, preventing such relative motion, until the load imposed is adequate to depress the springs and displace the balls from the recesses.

The '815 patent illustrates a very similar mechanism, but in this patent, rollers are mounted on lever arms that are pivoted on the hub. The rollers are disposed in spaced recesses formed in the outer rim of the chain-drive mechanism while the inner ends of the lever arms are spring loaded to bias the rollers into the recesses provided. Accordingly, the mechanism rotates as one unit until the torque load exceeds an amount sufficient to overcome the springs and move the rollers out of the recesses provided.

In the '000 patent, relative motion between the outer rim and hub is prevented by a plurality of friction discs located relatively between the two parts. The friction discs are biased by a resilient member against a "brake" plate so that relative rotation cannot occur until the frictional force exerted thereby is exceeded by the torque load imposed on the hoist.

From the foregoing, it can be seen that the same basic approach is used in each of the patents, but the precise mechanism used therein is entirely different. Each of the foregoing will function and each is relatively complex, and relatively expensive to manufacture.

Accordingly, an object of this invention is to provide an improved load limiting apparatus for a hoist that is relatively simple in structure, easy and inexpensive to manufacture, and easily maintained.

SUMMARY OF THE INVENTION

This invention provides an improved load limiting apparatus that comprises a chainwheel which includes a hub having an annular recess in the outer periphery thereof that is mounted on the hoist driveshaft. A generally annular clamping member is attached in juxtaposition to the hub forming an annular groove with the recess in the hub. An annular chainwheel rim is located in encircling relationship to the hub and clamping member, and has an outer periphery that includes a series of circumferentially spaced recesses for receiving the hoist drivechain, and has an inwardly projecting bifurcated flange located in the groove and in frictional engagement with the hub and clamping member, whereby the chainwheel rim is movable relative to the hub and clamping member when a pre-determined torque load has been imposed on the chainwheel.

BRIEF DESCRIPTION OF THE DRAWING

The foregoing and additional objects and advantages of the invention will become more apparent as the following detailed description is read in conjunction with the accompanying drawing, wherein like reference characters denote like parts in all views, and wherein:

FIG. 1 is a side elevation view of a hoist and chainwheel incorporating a load limiting apparatus of this invention.

FIG. 2 is a view, partially in elevation and partially in cross-section, of the chainwheel of FIG. 1 taken along the line 2—2 of FIG. 1.

DETAILED DESCRIPTION OF THE PREFERRED EMBODIMENT

Referring to the drawing and to FIG. 1 in particular, shown therein and generally designated by the reference character 10, is a chainwheel that is constructed in accordance with the invention.

The chainwheel 10 is illustrated as being mounted on a drive shaft 12 of a hoist (not shown). The chainwheel 10 is retained on the shaft 12 by a threaded hub 14 that forms part of the chainwheel 10, and by a hex nut 16 that is also threaded and serves to lock the hub 14 on the shaft 12.

In addition to the hub 14, the chainwheel 10 also includes a clamping member 18 that is disposed in juxtaposition to and is adjustably connected to the hub 14 by a plurality of threaded screws 20. The clamping member 18 includes a pair of radially projecting lugs 22 that are preferably located on diametrically opposed sides thereof. The lugs 22 each include a radially disposed surface 24 that is arranged to engage a projection 26 formed in a generally annular chainwheel rim member 28.

The chainwheel rim member 28 is provided in its outer periphery with a plurality of recesses 30 that are spaced about the circumference thereof and, in combination with recesses 32 formed in a second chainwheel rim member 34, are adapted to receive the drive chain (not shown) for the hoist. Except for the projections 26 formed in the chainwheel rim member 28, the chain members 28 and 34 are mirror images of each other.

Projecting inwardly from the chainwheel rim member 28 is an annular flange portion 36. Similarly, an annular flange portion 38 projects inwardly from the chainwheel rim member 34. It will be noted that the innermost ends of the flange portions 36 and 38 are disposed at an acute angle relative to each other, thus forming an annular bifurcated flange 40.

The bifurcated flange 40 is disposed in a groove 42 that is formed between a recess in the outer periphery of the hub 14 and the inner surface of the clamping member 18. It should be noted that the groove 42 is somewhat narrower than the bifurcated flange 40, so that tightening of the screws 20 permits variation of the frictional engagement between the bifurcated flange 40, and the clamping member 18 and hub 14.

As illustrated, the chainwheel 10 provides a positive drive mechanism in one direction, and provides a slip mechanism in the opposite direction. The positive drive is provided by the engagement of the projections 26 with the radial surfaces 24 on the lugs 22. When the chainwheel is being rotated in the counterclockwise direction as seen in FIG. 1, no slippage can occur between the hub 14, clamping member 18 and the chainwheel rim members 28 and 34. However, rotation of the chainwheel 10 in the clockwise direction permits relative movement between the chainwheel rim members 28 and 34, the hub 14 and clamping member 18, because when the lugs 22 engage the projections 26, the lugs 22 deflect the projections 26 inwardly instead of engaging them as is true in the counterclockwise direction of rotation. The projections 26 return to the positions illustrated as soon as they are out from under the abutments 22 since the rim members 28 and 34 are preferably manufactured from a steel or similar material having resilient characteristics.

The amount of torque required to cause slippage between the chainwheel rim members 28 and 34, and the hub 14 and clamping member 18 will be determined by the amount of closure of the groove 42. The amount of closure of the groove 42 is governed by the position of the screws 20. That is, if the screws 20 are screwed all the way in, bringing the clamping member 18 into abutting relationship with the hub 14, the groove 42 will be at its narrowest and the maximum frictional force between the bifurcated flange 40 and the hub 14 and clamping member 18 will occur. If the screws 20 are moved relatively outwardly, permitting the groove 42 to widen, less frictional force will be present between the bifurcated flange 40, the hub 14 and the clamping member 18. With less frictional force, it will take less relative torque between the chainwheel rim members 28 and 34, and the hoist shaft 12 to cause the relative slippage. Thus, the amount of load that can be carried in the hoist can be increased or decreased by adjusting the screws 20.

In operation, the hoist chain (not shown) is pulled causing the chainwheel rim members 28 and 34 to rotate. The hub 14, clamping member 18, and shaft 12 rotate with the rim members 28 and 34. If the load imposed on the hoist is greater than that designed to be handled by the hoist, pulling on the chain will cause the chainwheel members 28 and 34 to rotate, but slippage will occur between the bifurcated flange 40 and the hub 14 and clamping member 18. Thus, the load cannot be picked up and damage to the hoist is avoided as well as reducing the possibility of injuring the hoist user.

From the foregoing and detailed description, it will be appreciated that the improved load limiting apparatus for hoists provided herein, is extremely simple in structure, can be easily manufactured, and requires little or no maintenance while providing safety features desired in such a device.

The specific embodiment described is presented by way of example only and many changes and modifications can be made thereto without departing from the spirit or scope of the invention.

The embodiments of the invention in which an exclusive property or privilege is claimed are defined as follows:

1. In a hoist including a drive shaft and a drive chain, improved load limiting apparatus comprising a chainwheel that includes:

(a) a hub for mounting on the drive shaft, said hub having an annular recess in an outer periphery thereof;
(b) a generally annular clamping member attached in juxtaposition to said hub forming an annular groove with the recess in said hub; and,
(c) annular chainwheel rim means located in encircling relationship to said hub and clamping member, said chainwheel rim means having an outer periphery including a series of circumferentially spaced recesses for receiving the drive chain and having an inwardly projecting, axially bifurcated flange located in said groove with the bifurcated surfaces of said flange being spaced apart to effect a frictional engagement with said hub and clamping member, whereby said chainwheel rim means, hub and clamping member rotate together until a predetermined torque load is exceeded on said chainwheel at which time said chainwheel rim means moves relative to said hub and clamping member to limit the load imposed on said hoist.

2. In the hoist of claim 1, wherein said chainwheel rim means includes:
a first chainwheel rim member having an outer periphery including a portion of each said circumferentially spaced recess and having an inner flange portion arranged to fit into the annular groove formed by said hub and clamping member;
a second chainwheel rim member attached in juxtaposition to said first chainwheel rim member and having an outer periphery including the remainder of each said circumferentially spaced recess and having an inner flange portion arranged to fit into the annular groove formed by said hub and clamping member; and,
said inner flange portions having an angle therebetween forming said bifurcated flange.

3. In the hoist of claim 1 or 2, wherein:
(a) said clamping member includes at least one radially disposed lug; and,
(b) said chainwheel rim means includes an abutment engageable by said lug to prevent relative rotation between said chainwheel rim means and said hub and clampimg member in one rotational direction of said chainwheel rim means, while permitting relative rotation therebetween in an opposite rotational direction of said chainwheel rim means.

4. In the hoist of claim 3 wherein said abutment is resilient to permit deflection of said abutment by said clamping member when said chainwheel rim means is operated in said opposite rotational direction whereby said relative rotation can occur.

5. In the hoist of claim 4 wherein said chainwheel rim means is constructed of a resilient material and said abutment is integral therewith.

6. In the hoist of claim 1 wherein said bifurcated flange is wider than said groove and including means for adjustably attaching said clamping member is to said hub for permitting selective variation of the frictional engagement between said flange and hub and clamping member to vary the value of the load imposed on the hoist prior to relative movement between said chainwheel rim means and said hub and clamping member.

7. In the hoist of claim 5 wherein said bifurcated flange is wider than said groove and including means for adjustably attaching said clamping member to said hub for permitting selective variation of the frictional engagement between said flange and hub and clamping member to vary the value of the load imposed on the hoist prior to relative movement between said chainwheel rim means and said hub and clamping member.

* * * * *